US012615180B2

(12) United States Patent
Ingah

(10) Patent No.: US 12,615,180 B2
(45) Date of Patent: *Apr. 28, 2026

(54) TESTING FRAMEWORK FOR ADAPTIVE VIRTUAL SERVICES

(71) Applicant: CenturyLink Intellectual Property LLC, Denver, CO (US)

(72) Inventor: Zubin Ingah, Centennial, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 49 days.

This patent is subject to a terminal disclaimer.

(21) Appl. No.: 18/807,677

(22) Filed: Aug. 16, 2024

(65) Prior Publication Data

US 2024/0406061 A1 Dec. 5, 2024

Related U.S. Application Data

(63) Continuation of application No. 18/211,000, filed on Jun. 16, 2023, now Pat. No. 12,068,911, which is a continuation of application No. 17/589,919, filed on Feb. 1, 2022, now Pat. No. 11,683,219, which is a continuation of application No. 16/992,488, filed on Aug. 13, 2020, now Pat. No. 11,252,022.

(60) Provisional application No. 62/886,019, filed on Aug. 13, 2019.

(51) Int. Cl.
| | |
|---|---|
| *H04L 41/0631* | (2022.01) |
| *H04L 41/0686* | (2022.01) |
| *H04L 41/069* | (2022.01) |
| *H04L 41/0695* | (2022.01) |
| *H04L 43/50* | (2022.01) |

(52) U.S. Cl.
CPC ...... *H04L 41/0695* (2013.01); *H04L 41/0631* (2013.01); *H04L 41/069* (2013.01); *H04L 43/50* (2013.01); *H04L 41/0686* (2013.01)

(58) Field of Classification Search
CPC .............. H04L 41/0695; H04L 41/069; H04L 41/0686; H04L 41/0631; H04L 43/50
USPC ................................................. 370/216, 218
See application file for complete search history.

(56) References Cited

U.S. PATENT DOCUMENTS

| | | | |
|---|---|---|---|
| 10,498,744 B2 | 12/2019 | Hunt | |
| 10,999,123 B2 * | 5/2021 | Kelley, Jr. ........... | H04L 41/0631 |
| 11,146,623 B2 | 10/2021 | Jethanandani | |
| 11,252,022 B2 | 2/2022 | Ingah | |

(Continued)

*Primary Examiner* — Bharat Barot

(57) ABSTRACT

Examples of the present disclosure describe a testing framework for adaptive virtual services. In an example, a function vendor provides a network function having stated specifications to a service provider. A derived signature is generated for the network function (e.g., based on associated metadata, an image associated with the network function, and/or a network signature for the network function), which is used to classify the network function. The testing framework is used to test the network function according to its classification, thereby determining a set of capabilities. In examples, a network function having the same or similar signature as a previously tested network function may be categorized according to the previously tested network function. The network function is categorized according to its determined capabilities and added to an inventory of network functions for the service provider. Network functions in the inventory can then be selected to form a computer network.

5 Claims, 7 Drawing Sheets

(56)                References Cited

U.S. PATENT DOCUMENTS

| 11,695,568 | B1 * | 7/2023 | Kempf | H04L 67/10 |
| | | | | 713/176 |
| 12,068,911 | B2 * | 8/2024 | Ingah | H04L 41/0631 |
| 2016/0057209 | A1 * | 2/2016 | Parikh | H04L 41/122 |
| | | | | 709/203 |
| 2018/0069749 | A1 * | 3/2018 | Singhal | H04L 41/0631 |
| 2018/0121335 | A1 | 5/2018 | Cillis | |
| 2019/0068476 | A1 * | 2/2019 | Ranjit | H04L 43/12 |
| 2020/0177457 | A1 * | 6/2020 | Seenappa | H04L 41/0873 |
| 2020/0403864 | A1 | 12/2020 | Saenger | |
| 2021/0014217 | A1 | 1/2021 | Wei | |
| 2021/0051058 | A1 | 2/2021 | Ingah | |
| 2022/0109723 | A1 | 4/2022 | Mamadapur | |
| 2022/0158895 | A1 | 5/2022 | Ingah | |
| 2023/0198866 | A1 | 6/2023 | Gao | |
| 2023/0327945 | A1 | 10/2023 | Ingah | |

* cited by examiner

302 —— EVALUATE METADATA ASSOCIATED WITH NETWORK FUNCTION

304 —— GENERATE IMAGE SIGNATURE BASED ON NETWORK FUNCTION IMAGE

306 —— GENERATE NETWORK SIGNATURE BASED ON NETWORK FUNCTION PORTS

308 —— CLASSIFY NETWORK FUNCTION

342 — VERIFY NETWORK FUNCTION CONNECTIVITY

344 — CHECK THAT NETWORK FUNCTION IS INITIALIZED

346 — VALIDATE NETWORK FUNCTION CONFIGURATION

348 — VALIDATE ASSOCIATED MODULES

350 — VERIFY LOGGING CONFIGURATION

380

382 — IDENTIFY TEST SEQUENCE
FOR NETWORK FUNCTION

384 — SELECT TEST FROM TEST SEQUENCE

386 — EVALUATE NETWORK FUNCTION
BASED ON TEST

388 — ANOTHER
TEST IN SEQUENCE?          YES

NO

390 — GENERATE TEST RESULTS
FOR NETWORK FUNCTION

TESTING FRAMEWORK FOR ADAPTIVE VIRTUAL SERVICES

BACKGROUND

A computer network may comprise network functions that each provide different functionality. However, the actual capability of a network function may differ from the specifications stated by the vendor of the network function. For example, processing capacity and/or provided functionality of a network function may differ from the stated specifications, making it difficult to determine how the network function will behave in the computer network. As another example, it may be difficult to evaluate interoperability of the network function with other network functions in the computer network or to determine the ability of the network function to perform expected tasks, among other examples.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe a testing framework for adaptive virtual services. In an example, a function vendor provides a network function having stated specifications to a service provider. A derived signature is generated for the network function (e.g., based on associated metadata, an image associated with the network function, and/or a network signature for the network function), which is used to classify the network function. The testing framework described herein may be used to test the network function according to its classification, thereby determining a set of actual capabilities for the network function. In examples, a network function having the same or similar signature as a previously tested network function may be categorized according to the previously tested network function, thereby reducing the delay and/or amount of processing necessary to add a network function to inventory.

The network function is categorized according to its determined capabilities and added to an inventory of network functions for the service provider. Network functions in the inventory can then be selected to form a computer network. The selected set of network functions may be validated based on determined capabilities for each of the selected network functions. An alert of an identified incompatibility, a potential bottleneck, or other functionality issue may be generated if validation of the selected set of network functions fails.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1A:
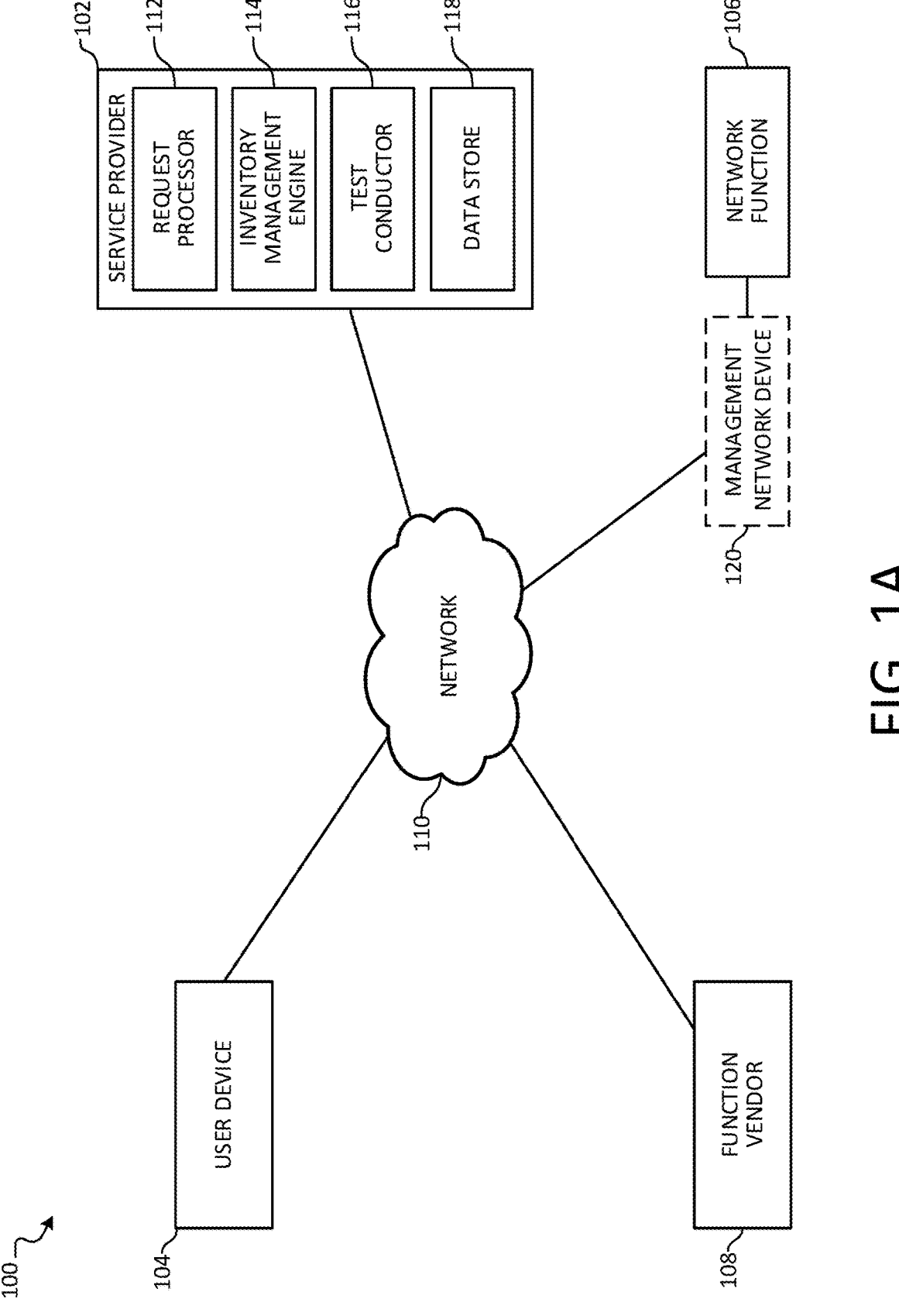
FIG. 1A illustrates an overview of an example system in which aspects of a testing framework for adaptive virtual services may be practiced.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Functionality of a computer network is provided by a set of network functions. In examples, a network function includes one or more of: a hardware device (e.g., a router, a switch, a software-defined wide area network (SD-WAN) device, a firewall device, etc.), a virtual network function (VNF) implemented as a virtual machine, or a container network function (CNF) that may comprise one or more executable files and associated configuration information executed in an execution environment. Other examples of network functions may comprise computing hardware, software, and combinations thereof, to provide particular functionality on a computer network. A vendor may provide specifications for a network function, such as processing capacity (e.g., throughput, number of supported connections, etc.), provided functionality, and/or one or more intended use-cases, among other specifications. However, the actual capability of a network function may differ from the stated specifications. In examples, specifications may vary among vendors (e.g., as a result of using different metrics, benchmarks, etc.) or may even vary among network functions of the same vendor. As a result, it is difficult to form a computer network using such network functions while reducing or avoiding compatibility issues, performance bottlenecks, or, in some instances, excess capacity.

Accordingly, aspects disclosed herein relate to a testing framework for adaptive virtual services. In examples, a derived signature is generated for a network function, which is then used to evaluate metadata associated with the network function and classify the network function accordingly. The network function is tested according to its classification in order to determine a set of actual capabilities. Depending its determined capabilities, the network function is categorized and added to an inventory of network functions. Inventoried network functions can then be selected (e.g., by a user, programmatically, etc.) for inclusion in a computer network. In examples, a network function having the same or similar signature as a previously tested network function may be categorized according to the previously tested network function, thereby reducing the delay and/or amount of processing necessary to add a network function to inventory.

The testing framework described herein reduces overhead and delays associated with adding or updating network functions in an inventory of network functions. For example, a network function may be received from a function vendor system, which is then automatically classified and categorized (e.g., based on a derived signature, one or more previously processed network functions, etc.) to add the network function to the inventory. Aspects disclosed herein also improve computing reliability by determining and testing actual network function capabilities to verify or refute vendor-stated specifications, thereby verifying that a network function will perform as expected within a computer network.

FIG. 1A illustrates an overview of an example system 100 in which aspects of a testing framework for adaptive virtual services may be practiced. As illustrated, system 100 comprises service provider 102, user device 104, network function 106, function vendor 108, and network 110. Service provider 102, user device 104, network function 106, and function vendor 108 are illustrated as communicating through network 110. Network 110 may comprise a local area network, a wide area network, and/or the Internet, among other examples. For example, service provider 102 interacts with network function 106 (e.g., via network configuration protocol (NETCONF), preboot execution environment (PXE), simple network management protocol (SNMP), secure shell (SSH), and/or trivial file transfer protocol (TFTP), etc.) over a local area network (e.g., via management network device 120), while function vendor 108 may communicate with service provider 102 (e.g., to provide network functions such as network function 106) via the Internet or other network connection. User device 104 may be any of a variety of computing devices, including, but not limited to, a mobile computing device, a tablet computing device, a laptop computing device, or a desktop computing device. It will be appreciated that, while system 100 is described with respect to one user device 104, one network function 106, and one function vendor 108, any number of such elements may be used in other examples.

In examples, function vendor 108 provides one or more network functions to service provider 102. As described above, the network functions are added to an inventory, such that the network function can then be used to form a computer network. For example, function vendor 108 uploads a virtual machine image comprising a VNF to service provider 102, wherein the virtual machine image comprises a disk image of the network function, a saved state for the virtual machine, and/or metadata (e.g., a network service descriptor, a manifest, etc.) associated with the virtual machine. The virtual machine image may be compressed and/or encrypted, such that service provider 102 processes the virtual machine image to uncompress and/or decrypt the image. In another example, function vendor 108 provides a CNF to service provider 102. As an example, a CNF is comprised of a container image that is executed in an execution environment comprising a pre-existing operating system. Thus, in some examples, a CNF may be more compact or lightweight than a VNF (which comprises a virtualized operating system). Similar to a VNF, a CNF may be compressed and/or encrypted and, in some examples, comprise metadata similar to a VNF. In other examples, function vendor 108 provides a physical device with which metadata is associated, as may be provided by function vendor 108. As such, it will be appreciated that network function 106 may comprise software and/or hardware.

Network function 106 is illustrated as connecting to network 110 via management network device 120. Management network device 120 is depicted using a dashed box to indicate that, in other examples, it may be omitted. Management network device 120 may be a router, a switch, or another network device. In examples, service provider 102 communicates with management network device 120 to determine the status of network function 106. For example, management network device 120 may provide information relating to a physical connection status of network function 106 (e.g., that the wiring is correct at the physical layer of the Open Systems Interconnection (OSI) model, a transmission rate, etc.) or a logical connection status of network function 106 (e.g., relating to the data link layer and/or the network layer of the OSI model, among other examples). As described above, network function 106 may be a physical device directly or indirectly (e.g., via intermediate routers, switches, etc.) connected to management network device 120. In another example, network function 106 is a CNF or VNF executing on a computing device connected to management network device 120.

In examples, service provider 102 manages an inventory of network functions for use in forming a computer network. For example, service provider 102 may be a telecommunications network service provider. Further, service provider 102 tests network functions according to aspects described herein. As illustrated, service provider 102 comprises request processor 112, inventory management engine 114, test conductor 116, and data store 118. Request processor 112 processes requests (e.g., as may be received from user device 104 and function vendor 108). For example, request processor 112 may receive a request from function vendor 108 to evaluate and add a network function to an inventory of network functions. In some examples, the request comprises the network function (e.g., a CNF, a VNF, etc.). In other examples, the request comprises information relating to a physical device (e.g., metadata, identifying information, etc.).

As another example, request processor 112 receives a request from user device 104 to generate or modify a computer network comprising a set of network functions (e.g., selected from an inventory of network functions managed by service provider 102). In examples, user device 104 displays a user interface (e.g., from a management application executing on user device 104, from a website provided by service provider 102, etc.) that enables a user to select a set of network functions from the inventory to design the computer network. The selected set of network functions may be validated based on determined capabilities for each of the network functions (e.g., as may be determined according to aspects described herein) and/or according to one or more requirements specified by the user. Based on the validation, an alert of an identified incompatibility, a potential bottleneck, or other functionality issue may be presented to the user. In response, a replacement network function may be provided to remedy the identified functionality issue. It will be appreciated that, in other examples, an indication is presented that the selected set of network functions will operate as expected (e.g., the network functions are compatible, satisfy an expected processor, memory, storage, and/or bandwidth requirement, etc.).

Inventory management engine 114 manages an inventory of network functions. In examples, inventory management engine 114 generates, accesses, and modifies inventory information relating to network functions, as may be stored in data store 118. Example inventory information includes, but is not limited to, a vendor, a hardware/software version, minimum execution environment specifications (e.g., processing requirements, memory requirements, storage requirements, an operating system version, etc.), stated specifications, test data generated as a result of testing the network function, and/or a set of determined capabilities. Data store 118 may also store VNF/CNF data (e.g., VNF virtual machine images, CNF container images, etc.), as may be received from a function vendor such as function vendor 108. In examples, request processor 112 communicates with inventory management engine 114 to determine a set of available network functions or, in some instances, to request a set of candidate network functions that are compatible with an existing set of network functions. In other examples, request processor 112 provides an indication as to a new network function for inclusion in the inventory (e.g., as may be received from function vendor 108). In such instances, inventory management engine 114 and test conductor 116 may communicate to evaluate the indicated network function according to aspects described herein, after which inventory management engine 114 adds the network function to the inventory according to its determined capabilities.

Service provider 102 is further illustrated as comprising test conductor 116. In examples, test conductor 116 evaluates a network function according to aspects described herein. For example, test conductor 116 generates a derived signature for network function 106. As an example, a derived signature is generated based on an analysis of an image, associated metadata, and/or a network signature (e.g., as may be generated based on open ports, software version information, using a tool such as NMAP SECURITY SCANNER, etc.) associated with network function 106. Test conductor 116 may use the derived signature to generate a set of predicted capabilities based on one or more similar network functions. For example, capabilities and derived signatures for previously evaluated or known network functions are used to train a classifier. The network function is classified according to its derived signature, thereby determining a set of predicted capabilities for the network function. The predicted capabilities may be compared with stated specifications of network function 106 provided by function vendor 108 to determine whether the stated specifications match the predicted capabilities of the network function (e.g., whether they are the same, whether a difference between an expected capability and stated specification is within a predetermined threshold, etc.). Test conductor 116 may test network function 106 according to the stated specifications (e.g., if the stated specifications match the set of expected capabilities) or the determined expected capabilities for the network function.

For example, if the stated specifications and/or expected capabilities indicate network function 106 is a router, network function 106 is tested as a router. As another example, if the stated specifications and/or expected capabilities indicate network function 106 is a firewall, network function 106 is tested as a firewall. It will be appreciated that, in some examples, a network function is determined to exhibit multiple functionalities (e.g., a router and a firewall, an SD-WAN and a router, etc.). In examples, test conductor 116 evaluates aspects of the computing environment prior to testing network function 106. For example, test conductor 116 verifies one or more network connections of network function 106, the availability of modules for testing network function 106 (e.g., according to the type of testing to be performed based on the classification of network function 106), and/or the ability to log aspects of the testing.

Based on the results of the testing, test conductor 116 determines a set of capabilities for network function 106. As used herein network function capability (or set of capabilities associated with a network function) includes, but is not limited to, one or more functionalities provided by a network function (e.g., router, firewall, SD-WAN, etc.) and available computing resources (e.g., relating to storage, memory, processing power, bandwidth, latency, etc.), among other examples. In examples, test conductor 116 provides an indication of the determined capabilities for network function 106 to inventory management engine 114, which categorizes network function 106 accordingly, thereby adding network function 106 to the inventory of available network functions. As described above, test conductor 116 may determine network function 106 is similar to a previously tested network function (e.g., based on the derived signature, stated specifications, etc.) and may instead use test results from the previously tested network function. In other examples, multiple similar network functions are tested to generate an average set of capabilities for network functions having a similar functionality, such that the determined capabilities are an average generated based on multiple network functions. As another example, one network function may be tested multiple times.

Figure 1B:
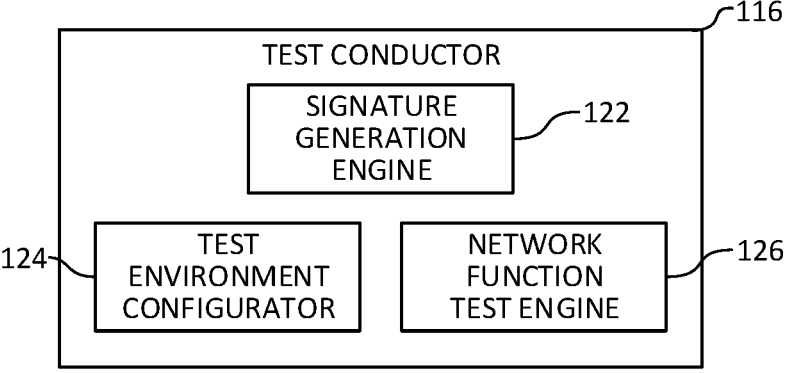
FIG. 1B illustrates an overview of an example test conductor for evaluating a network function according to aspects described herein.

FIG. 1B illustrates an overview of an example test conductor 116 for evaluating a network function according to aspects described herein. As illustrated, test conductor 116 comprises signature generation engine 122, test environment configurator 124, and network function test engine 126. Signature generation engine 122 generates a derived signature for a network function (e.g., network function 106 in FIG. 1A). Test environment configurator 124 uses the derived signature for the network function (and, in some instances, stated specifications and other metadata, etc.) to prepare the test environment for testing the network function. Accordingly, network function test engine 126 tests the network function to determine a set of capabilities for the network function. The network function is then categorized and added to an inventory of network functions accordingly, as described above.

Signature generation engine 122 generates a derived signature for a network function based on an analysis of an image, associated metadata, and/or a network signature associated with network function 106. For example, the evaluation comprises evaluating an image of the network function (e.g., a virtual machine image of a VNF or a container image of a CNF, etc.) to generate an image signature. The evaluation may comprise identifying one or more application binaries, strings, and/or signatures (e.g., a checksum, a hash, etc.) within the image.

In another example, signature generation engine 122 evaluates metadata associated with a network function, including, but not limited to, a network service descriptor, a manifest, and/or metadata received from a function vendor, such as function vendor 108 in FIG. 1A, among other examples. In some examples, metadata is received as part of the network function image and/or is provided by a function vendor using an application programming interface (API) or data-entry form on a website, among other examples. Such metadata includes, but is not limited to, a software version, a hardware version, an operating system type, a disk image type, and a set of functionality provided by the network function.

Signature generation engine 122 may also evaluate a network signature associated with a network function. As an example, a network signature for the network function is generated based on open ports, software version information associated with such open ports, and/or a media access control (MAC) address associated with the network function, among other examples. Thus, in some examples, the network signature is generated by initializing the network function (e.g., starting a virtual machine associated with a VNF, executing software associated with a CNF, powering on a physical device, etc.) and evaluating the presence of the network device on a network (e.g., network 110 in FIG. 1A). In some examples, at least a part of the evaluation is performed by a management network device, such as management network device 120 in FIG. 1A.

Test conductor 116 is further illustrated as comprising test environment configurator 124, which configures aspects of the test environment for testing a network function. For example, test environment configurator 124 configures one or more physical or virtual network interfaces of a network function (e.g., via a management network device, via SSH, etc.). In some examples, test environment configurator 124 communicates with a management network device (such as management network device 120 in FIG. 1A) to determine whether the network function is configured correctly (e.g., wired correctly, accessible over the network, etc.).

Test environment configurator 124 may evaluate other aspects of the environment prior to evaluating the network function. For example, network function test engine 126 of test conductor 116 may use various modules to test the network function. Accordingly, test environment configurator 124 may determine the availability of various modules for testing the network function. As another example, test environment configurator 124 may select a specific version of a module, or may prepare a set of modules (e.g., each having a specific version or set of versions) according to a certain configuration in preparation for testing. For example, test environment configurator 124 may perform such aspects based on the type of testing to be performed (e.g., based on the classification of the network function). As another example, test environment configurator 124 may verify that one or more logs can be written to a destination data store (e.g., a local storage device, a remote storage system, etc.).

Network function test engine 126 tests a network function to determine a set of capabilities provided by the network function. In examples, a set of tests is determined depending on the classification of the network function (e.g., as may be determined based on the derived signature generated by signature generation engine 122). Accordingly, network function test engine 126 performs the set of tests to determine the set of capabilities of the network function. Example tests include, but are not limited to, determining bandwidth throughput, network latency, and/or a maximum number of concurrent connections or users. In examples, network function test engine 126 communicates with one or more remote computing devices to instruct the computing devices to communicate with the network function. In other examples, network function test engine 126 communicates with the network function and/or uses one or more virtual machines, virtual network interfaces, and/or physical interfaces to test the network function. While example tests and testing techniques are described herein, it will be appreciated that any of a variety of tests and test techniques may be used in other examples.

In examples, test conductor 116 generates one or more prompts for user input and/or user confirmation. For example, test conductor 116 may request confirmation as to the network function to be tested, may request additional configuration information for testing, and/or may permit a user to enable/disable one or more tests from a set of tests. In other examples, test conductor 116 generates a report for a network function indicating how the network function performed for the set of tests. The report may indicate a set of determined functionality and, in some instances, how the network function performs with respect to each determined functionality. In some examples, a ranking or other comparison is provided, thereby indicating relative performance of the network function as compared to other network functions in inventory and/or previously tested network functions. In some examples, the report may compare determined functionality to stated functionality (e.g., as a percentage difference, in absolute terms, etc.). It will be appreciated that, in some instances, testing may be performed with little to no user input required.

Figure 2:
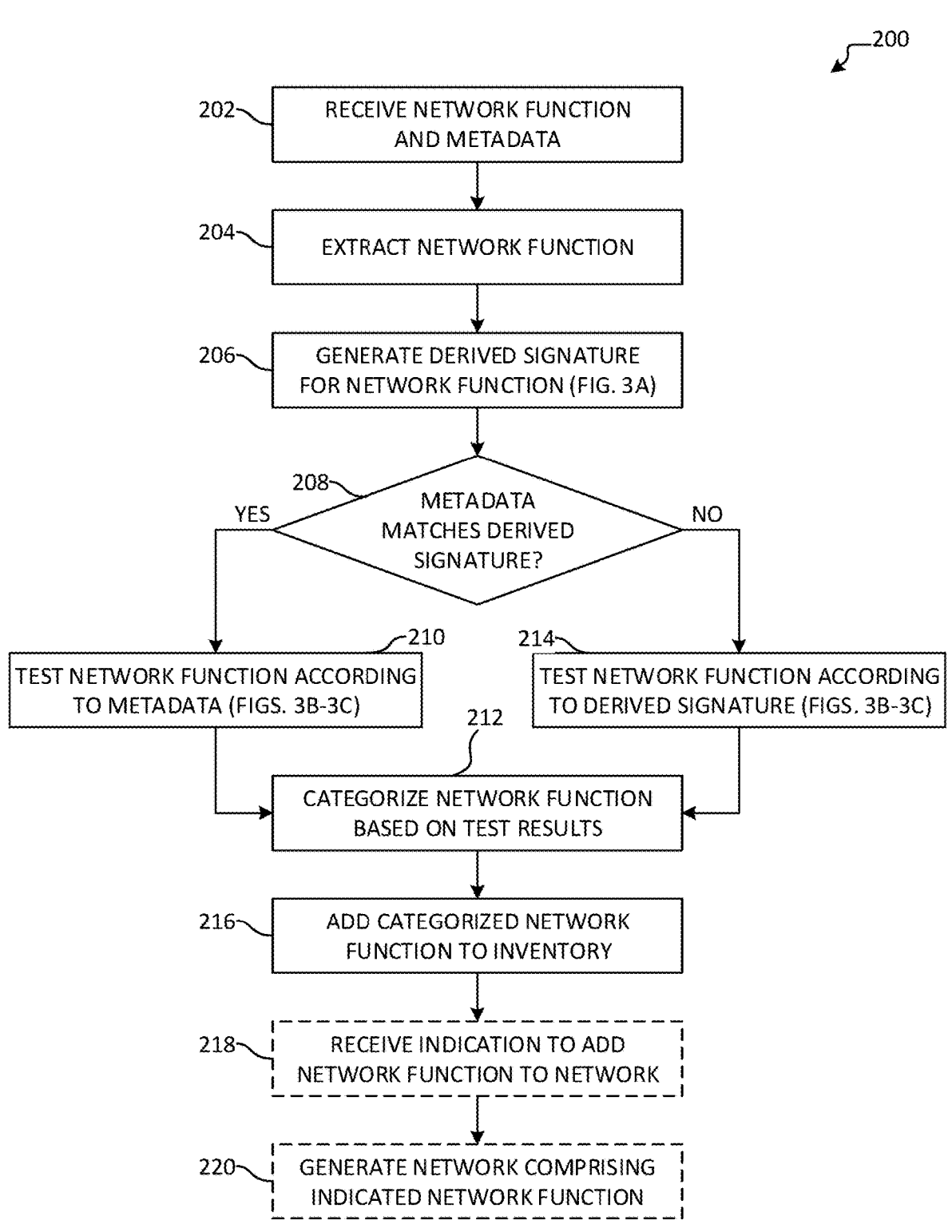
FIG. 2 illustrates an overview of an example method for evaluating a network function and categorizing the network function accordingly.

FIG. 2 illustrates an overview of an example method 200 for evaluating a network function and categorizing the network function accordingly. In examples, aspects of method 200 are performed by a service provider, such as service provider 102 in FIGS. 1A-1B. Method 200 begins at operation 202, where a network function and associated metadata are received. In examples, the network function and metadata are received by a request processor, such as request processor 112 in FIG. 1A. The network function may be a CNF or a VNF, which may be received from a function vendor via a network (e.g., from function vendor 108 via network 110 in FIG. 1A). In other examples, the network function is a physical device, wherein identifying information relating to the physical device (e.g., a serial number, a MAC address, etc.) may be received as part of the metadata.

At operation 204, the network function is extracted. As discussed above, a CNF or VNF may be transmitted in encrypted and/or compressed form. Accordingly, the network function is decrypted and/or uncompressed at operation 204. It will be appreciated that, in other examples, additional or alternative operations are performed to unpack or otherwise process a network function for testing according to aspects described herein. In examples where the network function is a physical device, operation 204 may be omitted.

Flow progresses to operation 206, where a derived signature is generated for the network function. As an example, a derived signature is generated based on an analysis of an image, associated metadata, and/or a network signature associated with the received network function. In some examples, aspects of operation 206 are performed by a signature generation engine, such as signature generation engine 122 in FIG. 1B. Additional examples of signature generation are discussed below with respect to method 300 in FIG. 3A.

At determination 208, it is determined whether the received metadata matches the derived signature. In examples, the determination comprises evaluating the derived signature using a trained classifier, wherein the trained classifier is trained based on capabilities and derived signatures for previous or known network functions. Accordingly, the classifier determines a set of expected capabilities based on the derived signature. The set of expected capabilities is compared to the received metadata, in order to determine whether the metadata matches the derived signature. As used herein, a "match" may be determined based on the metadata indicating the same capabilities as are in the set of expected capabilities (e.g., the same functionality, the same capacity, etc.), or a match may be inexact, wherein the metadata and the set of expected capabilities are similar within one or more predetermined thresholds.

If it is determined that the received metadata matches the derived signature, flow branches "YES" to operation 210, where the network function is tested according to the received metadata. As described above, a different set of tests may be used depending on the functionality provided by the network function. Thus, at operation 210, the set of tests is determined based on the received metadata. In examples, the tests are performed by a network function test engine, such as network function test engine 126 in FIG. 1B. In some examples, the test environment is configured prior to testing the network function, as may be performed by a test environment configurator, such as test environment configurator 124 in FIG. 1B. Additional examples of such aspects are discussed below with respect to methods 340 and 380 in FIGS. 3B and 3C, respectively. Flow then progresses to operation 212, which is discussed below.

If, however, it is determined that the metadata does not match the derived signature, flow instead branches "NO" to operation 214, where the network function is tested according to the derived signature. In examples, the derived signature is favored over the metadata at determination 208, as the metadata may overstate one or more capabilities of a network function or may be incorrect, among other examples. Testing may comprise performing similar aspects as discussed above with respect to operation 210 (e.g., based on the derived signature rather than the received metadata). Flow then continues to operation 212. In examples, it will be appreciated that operations 210 and 214 may be omitted based on determining that the metadata and/or derived signature match previous or known network functions. For example, a similarity score is generated (e.g., based on a comparison of derived capabilities, stated specifications, etc.) and compared to a predetermined threshold, such that network functions having a similarity score above the predetermined threshold is determined to "match" and may therefore be processed according to the similar network function at operation 212.

After operation 210 or operation 214, flow progresses to operation 212, where the network function is categorized based on the generated test results. In examples, the categorization comprises evaluating the performance of the network function compared to one or more predetermined thresholds to determine whether the network function exhibits sufficient performance to provide certain functionality. For example, a router may be expected to handle a threshold amount of traffic, such that a network function capable of processing at least the threshold amount is categorized as a router, while a network function exhibiting throughput lower than the threshold amount would not be categorized as a router. It will be appreciated that one or more thresholds may be associated with a given functionality. In examples, the network function is categorized into multiple categories or, in other examples, the network function is not categorized into any categories (e.g., if the network function performs poorly in most or all tests, etc.).

At operation 216, the network function is added to an inventory. In examples, the inventory may be part of a data store, such as data store 118 in FIG. 1A. In some examples, the inventory comprises one or more images associated with the network function or, in examples where the network function is a physical device, comprises identifying information associated with the network function. In some examples, test data generated at operation 210 or operation 214 is associated with the network function. In other examples, a derived signature generated at operation 206 is associated with the network function in the data store.

Operations 218 and 220 of method 200 are depicted using dashed boxes to indicate that, in some examples, operations 218 and 220 are omitted. In such examples, method 200 terminates at operation 216. In other examples, flow progresses to operation 218, where an indication to add the network function to a computer network is received. In examples, the indication is received from a user device by a request processor, such as user device 104 and request processor 112 of service provider 102 in FIG. 1A. In some examples, the computer network is a preexisting network comprised of a set of other network functions. In other examples, the computer network is a new computer network, wherein the indicated network function is the first network function in the set of network functions. In some examples, the indication further comprises one or more requirements associated with the computer network, such as a minimum throughput rate, minimum number of users, or minimum number of concurrent connections, among other examples.

Accordingly, at operation 220, a computer network is generated comprising a set of network functions that includes the indicated network function. In examples, operation 220 comprises validating the set of network functions to determine whether the set of network functions will operate together as expected (e.g., whether there are incompatibilities, functionality mismatches, bottlenecks, etc.). In some examples, one or more requirements (e.g., as may have been received at operation 218) are evaluated to determine whether the set of network functions satisfies the requirements (e.g., that capabilities for the network functions are above a certain throughput, meet a certain number of users or computing devices, etc.). As described above, an alert of an identified issue (e.g., incompatibility, a potential bottleneck, etc.) or an indication that the selected set of network functions will operate as expected may be provided in response to the received indication for display to a user. Method 200 terminates at operation 220.

Figure 3A:
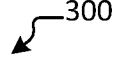
FIG. 3A illustrates an overview of an example method for generating a derived signature for a network function.
Figure 3A:
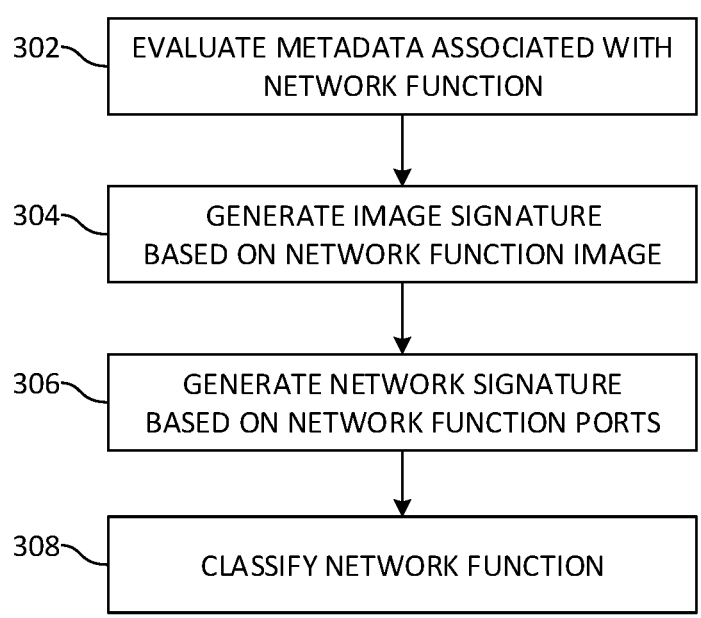

FIG. 3A illustrates an overview of an example method 300 for generating a derived signature for a network function. In examples, aspects of method 300 are performed by a signature generation engine, such as signature generation engine 122 of test conductor 116 in FIG. 1B. In other examples, aspects of method 300 are performed at operation 206 of method 200 in FIG. 2, as discussed above.

Method 300 begins at operation 302, where metadata associated with a network function is evaluated. Example metadata includes, but is not limited to, a network service descriptor, a manifest, and/or metadata received from a function vendor, among other examples. In some examples, metadata is received as part of the network function image and/or is provided by a function vendor using an application programming interface (API) or data-entry form on a website, among other examples. For example, the metadata may be metadata received at operation 202 of method 200 in FIG. 2. Information provided by such metadata includes, but is not limited to, a software version, a hardware version, an operating system type, a disk image type, and a set of functionality provided by the network function.

At operation 304, an image signature is generated for the network function based on an associated image. As described above, a container image may be evaluated for a CNF or a virtual machine image may be evaluated for a VNF. In examples, data may be accessed from a physical device at operation 304. In examples, one or more application binaries, strings, and/or signatures (e.g., a checksum, a hash, etc.) are identified within the image and used to generate the image signature. For example, the image signature may be based on or comprise information relating to identified software packages (and associated version information), an operating system version/platform type, an image format, and/or one or more last-modified or created dates.

Flow progresses to operation 306, where a network signature is generated. As an example, a network signature is generated based on open ports, software version information associated with such open ports, and/or a MAC address associated with the network function, among other examples. In examples, the network signature is generated by initializing the network function (e.g., starting a virtual machine associated with a VNF, executing software associated with a CNF, powering on a physical device, etc.) and evaluating the presence of the network device on a network. In some examples, at least a part of the evaluation is performed by a management network device, such as management network device 120 in FIG. 1A.

Moving to operation 308, the network function is classified based on the metadata evaluation, image signature, and network signature from operations 302, 304, and 306, respectively. In examples, a trained classifier is used. The trained classifier may be trained based on metadata and derived signatures for previous or known network functions. For example, as network functions are added to the inventory, the classifier may be retrained so as to better identify and classify similar network functions in the future. Accordingly, the classifier determines a set of expected capabilities for the network function, which may be compared to the received metadata (e.g., examples of which are described above with respect to determination 208 in FIG. 2). Flow terminates at operation 308. While example signature generation and classification techniques are described herein, it will be appreciated that any of a variety of other techniques may be used to derive a signature for a network function and to classify the network function accordingly.

Figure 3B:
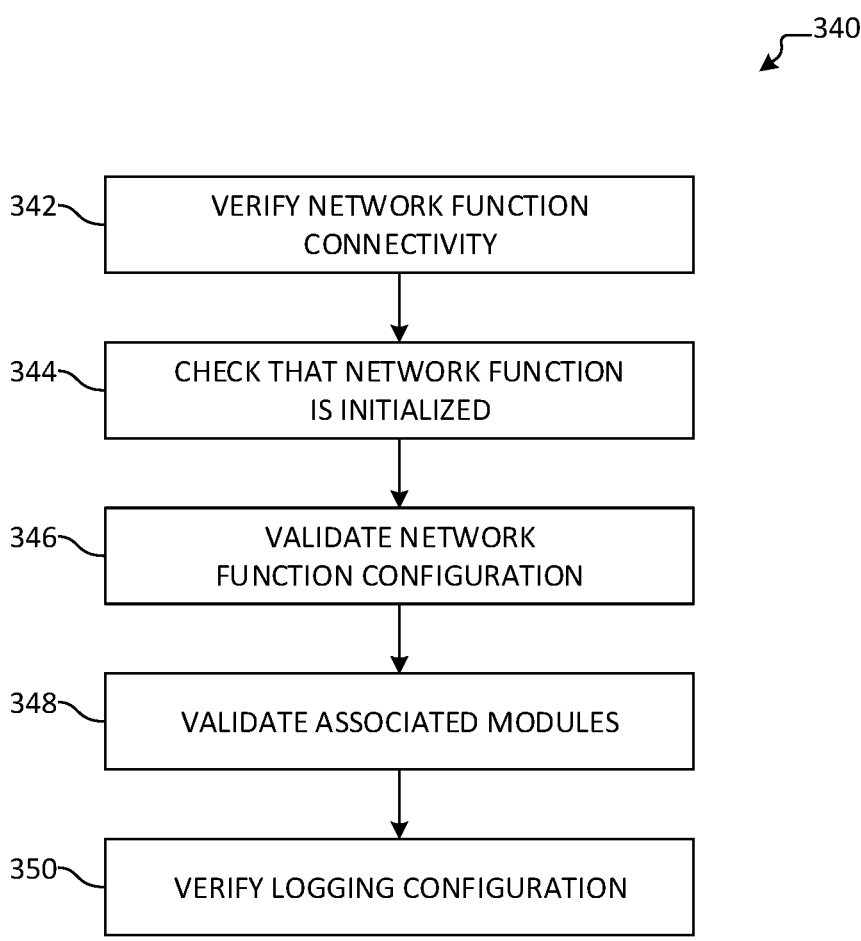
FIG. 3B illustrates an overview of an example method for initializing a test environment for a network function.

FIG. 3B illustrates an overview of an example method 340 for initializing a test environment for a network function. In examples, aspects of method 340 are performed by a test environment configurator, such as test environment configurator 124 of test conductor 116 in FIG. 1B. In other examples, aspects of method 340 are performed at operations 210 and/or 214 of method 200 in FIG. 2, as discussed above. Method 340 begins at operation 342, where network function connectivity is verified. For example, a physical and/or logical connection status of the network function 106 may be verified. In some examples, one or more physical or virtual network interface connections of the network function are configured at operation 342. In some examples, a management network device (such as management network device 120 in FIG. 1A) is used to perform at least a part of operation 342.

Flow progresses to operation 344, where it is verified that the network function is initialized. In examples, operation 344 comprises evaluating a hypervisor associated with the network function to verify that the network function is executing. As another example, the evaluation comprises processing a log associated with the network function to determine whether any warnings and/or errors are present. In other examples, a list of processes executing on a computing device is evaluated or one or more ports may be scanned. While example techniques are described for determining whether a network function is initialized, it will be appreciated that any of a variety of other techniques may be used.

Moving to operation 346, the configuration of the network function is validated. In examples, validating the configuration comprises verifying the network configuration of the network function (e.g., relating to a routing table, an internet protocol (IP) address, firewall rules, etc.). In examples, different operations are performed to validate the configuration of the network function depending on the functionality provided by the network function. For example, if the network function provides routing functionality, a routing table is validated. As another example, if the network function provides firewall functionality, a set of firewall rules are validated. While example configurations and associated validation techniques are described, it will be appreciated that any of a wide variety of other configuration aspects can be validated at operation 346.

At operation 348, modules associated with the testing are validated. As discussed above, various modules may be used to test a network function. Accordingly, the availability of various modules for testing the network function is determined at operation 348. In examples, a specific version of a module is selected or, in other examples, a specific set of modules may be prepared according to a certain configuration in preparation for testing. It will be appreciated that the conditions and modules that are validated may vary depending based on the type of testing to be performed.

Flow progresses to operation 350, where the logging configuration is verified. For example, it may be determined that a destination data store (e.g., a local storage device, a remote storage system, etc.) is available, on which one or more logs and other test data may be stored. In another example, user input may be requested relating to the type of logging that should be performed, where log information should be stored, etc. Flow terminates at operation 350. It will be appreciated that method 340 is provided as an example set of operations that are performed to prepare the test environment when testing one or more network functions. In other examples, additional, fewer, or alternative operations may be performed.

Figure 3C:
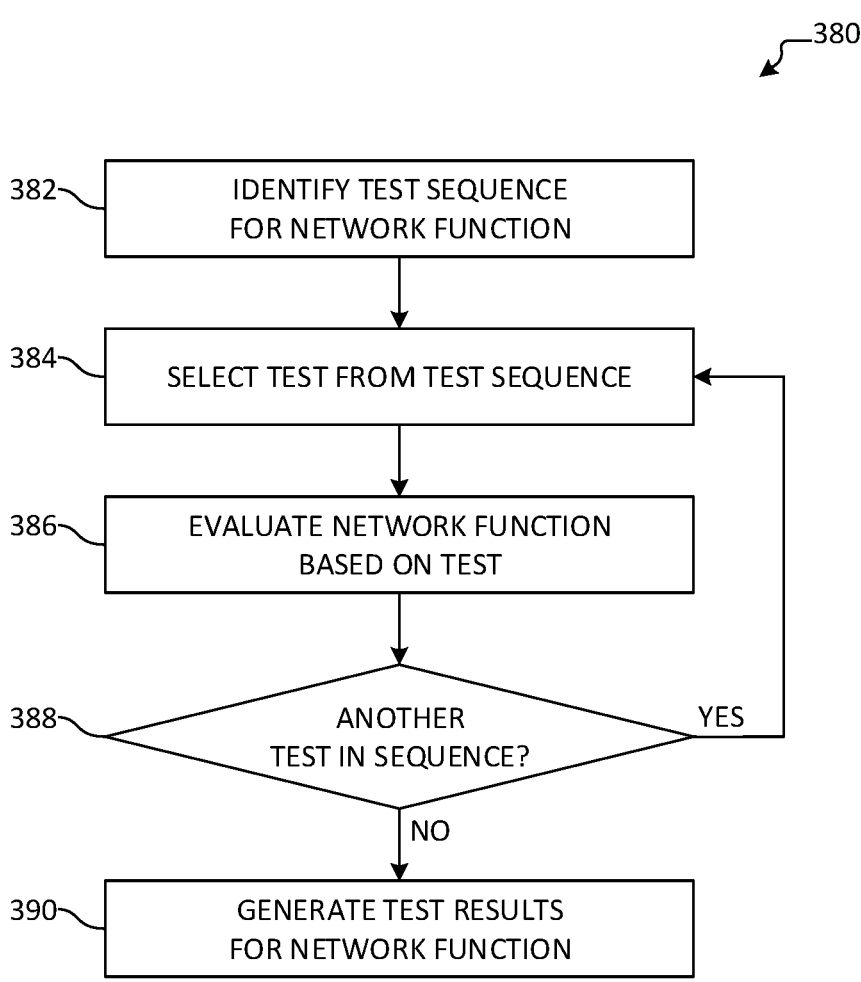
FIG. 3C illustrates an overview of an example method for testing a network function.

FIG. 3C illustrates an overview of an example method 380 for testing a network function. In examples, aspects of method 380 are performed by a network function test engine, such as network function test engine 126 of test conductor 116 in FIG. 1B. In other examples, aspects of method 380 are performed at operations 210 and/or 214 discussed above with respect to method 200 in FIG. 2. Method 380 begins at operation 382, where a test sequence is identified for a network function. As used herein, a test sequence comprises a set of tests to perform for a network function. The test sequence may be determined based on a classification of the network function according to aspects described herein. In examples, the test sequence is an ordered list of tests or, in other examples, may be unordered, or any combination thereof.

At operation 384, a test is selected from the test sequence. In examples where the test sequence comprises an ordered list of tests, the test is selected according to the list. In other examples, the test is selected according to a user indication as to the test that should be selected and performed. Flow progresses to operation 386, where the network function is evaluated based on the test. In examples, the evaluation is performed at least in part using a management network device, such as management network device 120 in FIG. 1A. In some examples, the evaluation comprises evaluating the network function according to a predetermined threshold, as may be specified by the test or may be determined based on a historical average, among other examples.

At determination 388, it is determined whether there is another test to perform in the test sequence. In some examples, the test sequence comprises an indication that a test should be performed multiple times. In such instances, the same test may be performed again at operations 384-386. In other examples, flow branches "YES" to operation 384 where another test is selected from the test sequence as described above. In some instances, the selection of a subsequent test at operation 384 is dependent on the outcome of a previous test. Accordingly, it will be appreciated that a set of tests need not be only sequential, but may instead be conditional and/or may be structured as a tree, among other examples.

However, if it is determined at determination 388 that there is not another test in the test sequence, flow instead branches "NO" to operation 390, where test results are generated for the network function. In examples, the test results comprises a result for each test in the test sequence. In some instances, the result is compared to a threshold or historical average, thereby indicating whether the network function passed or failed the test. In other examples, the test result is a value associated with a given test (e.g., peak throughput, average latency, memory consumption, etc.). It will be appreciated that while example results are described herein, any of a variety of test results may be generated according to other examples similar to method 380. The test results are then used to categorize a network function, examples of which are discussed above with respect to operation 212 of method 200 in FIG. 2.

Figure 4:
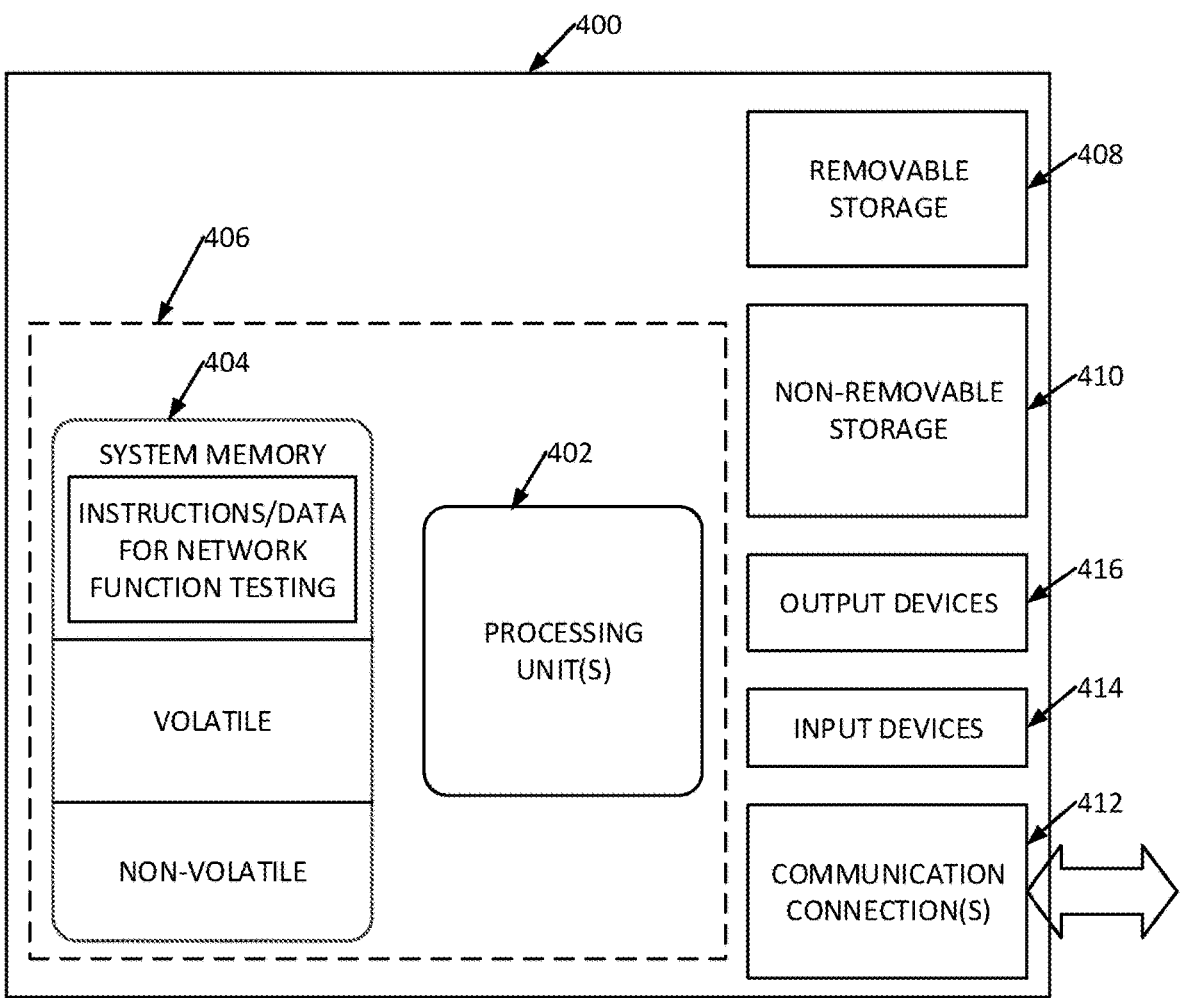
FIG. 4 illustrates an example of a suitable operating environment in which one or more of the present embodiments may be implemented.

FIG. 4 illustrates an example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically may include at least one processing unit 402 and memory 404. Depending on the exact configuration and type of computing device, memory 404 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as a keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 may include at least some form of computer readable media. The computer readable media may be any available media that can be accessed by processing unit 402 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 404. While executing on the processing unit 402, program modules (e.g., applications, Input/Output (I/O) management, and other utilities) may perform processes including, but not limited to, one or more of the stages of the operational methods described herein such as the methods illustrated in FIGS. 2 and 3A-3C, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

As will be understood from the foregoing disclosure, one aspect of the technology relates to a system comprising: at least one processor; and memory storing instructions that, when executed by the at least one processor, causes the system to perform a set of operations. The set of operations comprises: receiving an indication of a network function, the indication comprising metadata associated with the network function; generating, based on the metadata associated with the network function, a derived signature for the network function; evaluating, based on the derived signature, the network function to determine a set of capabilities; and adding the network function to an inventory of network functions according to the determined set of capabilities. In an example, the indication of the network function further comprises an image associated with the network function. In another example, the network function is a physical network function, and the indication of the network function further comprises identifying information associated with the physical network function. In a further example, generating the derived signature for the network function further comprises an analysis of the image associated with the network function. In yet another example, the set of operations further comprises generating a network signature for the network function, and generating the derived signature for the network function is further based on the network signature. In a further still example, evaluating the network function comprises: determining, based on the derived signature, a set of tests for the network function; and performing the set of tests to determine the set of capabilities. In an example, evaluating the network function comprises: identifying another network function having a similar derived signature; and determining the set of capabilities for the network function based on another set of capabilities for the another network function. In a further example, the set of operations further comprises: receiving, from a computing device, an indication of a computer network comprising a set of network functions from the inventory of network functions; evaluating a set of capabilities for each network function of the set of network functions to validate the set of network functions of the computer network; and based on identifying an incompatibility for the set of network functions, providing an indication of the incompatibility to the computing device.

In another aspect, the technology relates to a method for validating a computer network comprising a set of network functions. The method comprises: receiving, from a user device, an indication of the computer network comprising the set of network functions; validating, based at least in part on a set of capabilities for each network function of the set of network functions, the computer network to identify a functionality issue; and when a functionality issue is identified, generating an alert associated with the identified functionality issue, wherein the alert comprises an indication of at least one network function of the set of network functions. In an example, the indication further comprises a requirement associated with the computer network, and validating the computer network comprises: identifying a determined capability for a first network function from a network function inventory; and evaluating the determined capability of the first network function based on the requirement associated with the computer network to identify a functionality issue for the computer network. In another example, validating the computer network comprises: evaluating a first network function and a second network function of the set of network functions to identify a functionality issue between the first network function and the second network function, the functionality issue comprising at least one of: an incompatibility; a performance bottleneck; or a functionality mismatch. In a further example, the method further comprises: receiving, in response to the alert comprising an indication of the at least one network function, an indication of a replacement network function for the computer network in place of the at least one network function; generating an updated set of network functions that includes the replacement network function and omits the at least one network function; validating the updated set of network functions based at least in part on a set of capabilities for each network function of the updated set of network functions; and providing an indication that the updated set of network functions is validated.

In a further aspect, the technology relates to a method for processing a network function to add the network function to an inventory of network functions. The method comprises: receiving an indication of the network function, the indication comprising metadata associated with the network function; generating, based on the metadata associated with the network function, a derived signature for the network function; evaluating, based on the derived signature, the network function to determine a set of capabilities; and adding the network function to the inventory of network functions according to the determined set of capabilities. In an example, the indication of the network function further comprises an image associated with the network function. In another example, the network function is a physical network function, and the indication of the network function further comprises identifying information associated with the physical network function. In a further example, generating the derived signature for the network function further comprises an analysis of the image associated with the network function. In yet another example, the method further comprises: generating a network signature for the network function, and wherein generating the derived signature for the network function is further based on the network signature. In a further still example, evaluating the network function comprises: determining, based on the derived signature, a set of tests for the network function; and performing the set of tests to determine the set of capabilities. In another example, evaluating the network function comprises: identifying another network function having a similar derived signature; and determining the set of capabilities for the network function based on another set of capabilities for the another network function. In a further example, the method further comprises: receiving, from a computing device, an indication of a computer network comprising a set of network functions from the inventory of network functions; evaluating a set of capabilities for each network function of the set of network functions to validate the set of network functions of the computer network; and based on identifying an incompatibility for the set of network functions, providing an indication of the incompatibility to the computing device.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system comprising:

at least one processor; and memory storing instructions that, when executed by the at least one processor, causes the system to perform a set of operations, the set of operations comprising:

receiving, from a user device, an indication of a computer network comprising a set of network functions;

validating, based at least in part on a set of capabilities for each network function of the set of network functions, the computer network to identify a functionality issue; and when a functionality issue is identified, generating an alert associated with the identified functionality issue, wherein the alert comprises an indication of at least one network function of the set of network functions, and wherein the indication comprises a requirement associated with the computer network, wherein validating the computer network comprises:

identifying a determined capability for a first network function from a network function inventory; and evaluating the determined capability of the first network function based on the requirement associated with the computer network to identify a functionality issue for the computer network.

2. The system of claim 1, the set of operations further comprising:

receiving, in response to the alert comprising an indication of the at least one network function, an indication of a replacement network function for the computer network in place of the at least one network function;

generating an updated set of network functions that includes the replacement network function and omits the at least one network function;

validating the updated set of network functions based at least in part on a set of capabilities for each network function of the updated set of network functions; and providing an indication that the updated set of network functions is validated.

3. A method for validating a computer network comprising a set of network functions, comprising:

receiving, from a user device, an indication of the computer network comprising the set of network functions;

validating, based at least in part on a set of capabilities for each network function of the set of network functions, the computer network to identify a functionality issue; and when a functionality issue is identified, generating an alert associated with the identified functionality issue, wherein the alert comprises an indication of at least one network function of the set of network functions, and wherein the indication comprises a requirement associated with the computer network, wherein validating the computer network comprises:

identifying a determined capability for a first network function from a network function inventory; and evaluating the determined capability of the first network function based on the requirement associated with the computer network to identify a functionality issue for the computer network.

4. The method of claim 3, wherein validating the computer network comprises:

evaluating a first network function and a second network function of the set of network functions to identify a functionality issue between the first network function and the second network function, the functionality issue comprising at least one of:

an incompatibility;

a performance bottleneck; or a functionality mismatch.

5. The method of claim 3, further comprising:

receiving, in response to the alert comprising an indication of the at least one network function, an indication of a replacement network function for the computer network in place of the at least one network function;

generating an updated set of network functions that includes the replacement network function and omits the at least one network function;

validating the updated set of network functions based at least in part on a set of capabilities for each network function of the updated set of network functions; and providing an indication that the updated set of network functions is validated.

\* \* \* \* \*